United States Patent Office 3,792,026
Patented Feb. 12, 1974

3,792,026
HIGH MOLECULAR WEIGHT OLEFIN POLYSULFONE RESINS AND PROCESS FOR THEIR PREPARATION
Bobby Leroy Atkins, William Marvin Welsh, and William Ross Moore, Lake Jackson, Tex., assignors to The Dow Chemical Company, Midland, Mich.
No Drawing. Continuation-in-part of abandoned application Ser. No. 693,150, Dec. 26, 1967. This application Sept. 8, 1970, Ser. No. 70,537
Int. Cl. C08f 13/06
U.S. Cl. 260—79.3 A                 10 Claims

ABSTRACT OF THE DISCLOSURE

A process for the suspension polymerization of sulfur dioxide and alpha-monoolefinic monomers in water with a suspending agent is described. The resultant high molecular weight copolymers are useful as water repellant coatings for metals, concrete and fabrics. The copolymers are characterized by the fact that they have a peak molecular weight in the range $1.5 \times 10^5$ to $2.5 \times 10^6$.

CROSS-REFERENCES TO RELATED APPLICATIONS

This application is a continuation-in-part of our copending application Ser. No. 693,150, filed Dec. 26, 1967, now abandoned.

BACKGROUND OF THE INVENTION

In one aspect, this invention relates to high molecular weight olefin polysulfone resins made by the reaction between sulfur dioxide and a $C_{10}$–$C_{20}$ alphamonoolefin hydrocarbon monomer and mixtures thereof.

In another aspect, this invention relates to the preparation of high weight average molecular weight copolymers of sulfur dioxide and $C_{10}$–$C_{20}$ alpha-monoolefinic monomers by the suspension polymerization of the monomers in water containing a suspending agent.

It is known to prepare olefin sulfone resins by the emulsion polymerization process. This process is shown and described in U.S. Pat. 2,645,631 and "Industrial and Engineering Chemistry," vol. 47, #1, pages 160–165 (January 1955).

Earlier processes used (1) an excess of sulfur dioxide to provide solution polymerization (U.S. Pat. 2,184,-295), (2) an inert hydrocarbon solvent for both reactants (U.S. Pat. 2,294,027), or (3) a bulk polymerization in a sealed pressure bottle (U.S. Pat. 2,112,986).

These prior art processes suffer from numerous disadvantages. Thus, in the bulk polymerization process the resin produced had a horn-like appearance and had to be chopped out or dissolved out of the reactor, the resin was impure and included a relatively high percentage of the monomers which were difficult to remove, and the yields of resin were low.

In the solution technique, the polymer was recovered as a viscous solution in the solvent used, the solvent was usually toxic, inflammable, or expensive and its recovery was expensive, the molecular weight distribution of the polymer was broad, and the purification of the resin was difficult due to occluded monomers and solvent.

The emulsion technique suffers from the disadvantages that the polymer has to be coagulated from the resin system and the particle size produced was so small that filtration and processing were difficult. Also the high molecular weight olefins, i.e. those having ten or more carbon atoms, were especially difficult to polymerize, perhaps due to their hydrophobic nature.

SUMMARY OF THE INVENTION

We have now discovered means to prepare high weight average molecular weight olefin polysulfones from sulfur dioxide and mixed or pure alpha-monoolefins of 10–20 carbon atoms by suspension polymerization in an aqueous medium with a suspending agent such as non-ionic surfactants, anionic surfactants and copolymers of alkyl styrenes and N-vinyl heterocyclic monomers.

The olefin polysulfones prepared by our process are characterized by the fact that they have a peak molecular weight in the range $1.5 \times 10^5$ to $2.5 \times 10^6$ as measured by Gel Permeation Chromatography. G.P.C. is a well known analytical technique in the polymer field as is illustrated by the article by R. L. Bartosiewicz entitled, "The Use of Gel Permeation Chromatography as an Analytical Tool in the Coating Industry," Journal of Paint Technology 39:28–39 #504, January 1967.

For the purpose of this invention, a polymer having a high weight average molecular weight is one having a plurality of polymer species with more than 50% by weight of the polymer species above a million molecular weight. Polymers having a peak molecular weight in the range $1.5 \times 10^5$ to $2.5 \times 10^6$ will have more than 50% by weight of the polymer species above one million and thus can be called high molecular weight polymers.

It is an object of this invention to provide a process for the production of high molecular weight olefin polysulfones in a facile and economic manner.

It is a further object of this invention to provide a process for the production of high molecular weight olefin polysulfones in which the final product is produced in a discrete bead form which can be separated easily from the reaction mixture.

The molecular weight of the polymers made according to this process may be controlled by varying (1) catalyst concentration, (2) iron concentration, and (3) temperature of reaction.

The molecular weight varies inversely with the amount of catalyst used, the iron concentration and the temperature, i.e., increasing the concentrations and temperatures lowers molecular weight.

Other objects and features of the invention will become more apparent from the following description.

DETAILED DESCRIPTION

We have found that high molecular weight olefin polysulfones can be prepared from a commercial grade of alpha-monoolefins made by the polymerization of ethylene, in which the olefins have a range of carbon atoms from 10 to 20 and commercial grade sulfur dioxide by reacting these monomers while the starting olefin liquid is dispersed as non-colloidal droplets in an aqueous suspending medium by mechanical action, e.g. in a stirred reactor, with a surfactant or other suspending agent and chemical catalyst for the reaction. The polymerization can also be favorably effected by the aid of radiation.

The high molecular weight products of our process are useful as water repellant coatings for metals, fabrics, and construction products such as concrete, bricks, fiberboard, wood siding, etc.

Our reaction produces discrete beads of the desired polymer having a range of diameters from 30 microns to 3000 microns which are suspended in the aqueous reaction media and are easily recovered, e.g. by a simple filtration step.

The particle size can be easily varied as desired. Thus, an increase in the stirrer speed will decrease the particle size. The addition of the wetting agent before the addition of the alpha-olefin and the catalyst will give a decrease in particle size over that in which the wetting agent is added after the alpha-olefin and catalyst is added. The time of the addition of the surfactant after the alpha-olefin, catalyst, and sulfur dioxide have started reacting can be varied to give various desired particle sizes. Generally, a time period of up to 60 minutes is satisfactory to give a good yield of polymer in bead form. A period longer than this is to be avoided since the newly formed polymer beads will coalesce into a polymeric mass. A preferred time is one of less than 20 minutes.

We have found that normally ambient temperatures (25° C.) are operable. Our preferred temperature range is from 10°–25° C. However, the reaction is operable from the freezing point of the saturated sulfur dioxide solution, about —20° C., to the ceiling temperature of the polysulfone formed from the alpha-olefin used. The ceiling temperature for polysulfones has been defined as that temperature at which decomposition of the polysulfone equals the formation rate of the same from the olefin and $SO_2$. (Cook et al., "Journal of Polymer Science," vol. 26, pages 351–364 (1957)). For example, the ceiling temperature for $C_{16}$–$C_{20}$ alpha-olefin hydrocarbon polysulfone is 30–40° C.

The time of the reaction can vary from one hour to 48 hours. Generally, we have found that the reaction is substantially complete in 4–16 hours. Of course, the time of reaction and the temperature are interdependent and vary inversely with respect to each other as is well known.

The pressure on the reaction can likewise vary over a wide range from 250 mm. Hg to about 70 atmospheres. We prefer to run the reaction within the range of normal atmospheric pressure to 3–4 atmospheres, with normal atmospheric pressure being desirable because of the economy obtained by using non-pressurized equipment.

The catalysts used in our reaction are not critical and can be one of several classes such as organic peroxide catalysts and ionic catalysts. Examples of the former are t-butyl peroxy pivalate, benzoyl peroxide, methyl ethyl ketone peroxide, diisopropyl peroxy dicarbonate, and $\alpha,\alpha'$-azobisisobutyronitrile. Examples of the latter are lithium nitrate, ammonium nitrate, lithium perchlorate, lithium persulfate, lithium nitrite, ammonium perchlorate, ammonium persulfate, and ammonium nitrite. Silver nitrate and other silver salts have not been found to be operable since the reaction conditions used herein apparently reduce the silver ions to metallic silver.

Irradiation can be used instead of a chemical catalyst if desired. The amount of radiation used should be from about 0.02 to about 5.0 megarad and preferably from 0.1 to 0.5 megarad. Any convenient source of gamma rays or high velocity high energy electrons may be used. Furthermore, a combination of irradiation and chemical catalysis may be used if desired.

We prefer to use t-butyl peroxy pivalate as the catalyst since it gives the best results. The amount used is generally well known in the art. We have found that a range of 0.1% to 10% by weight based on the olefin reactant is operable but we prefer to operate in the range of 0.25% to 5.0%.

A small amount of ferrous ions, conveniently added as a soluble salt, e.g. $FeSO_4$ is usually added as a promoter for the peroxy catalyst. These ions activate the catalyst, increasing the reaction rate and causes the beads to pass the "sticky" stage rapidly during which time the beads have a tendency to coalesce. It does, however, lower the molecular weight, so a minimum quantity of ferrous ion, such as 10–50 p.p.m. of the ferrous ion based on olefin, is desired, and 15–25 p.p.m. is preferred.

As suspending agents we have used both anionic and nonionic-type surfactants as well as copolymers of alkyl styrenes and N-vinyl heterocyclic monomers which contain 20 to 80 percent by weight of alkyl styrene and 80 to 20 percent of the N-vinyl heterocyclic monomer. Cationic surfactants are not operable as they have a deleterious effect upon the catalysts, stopping the reaction. Examples of the nonionic type surfactant are: nonylphenoxy polyethoxy ethanols containing different amounts of ethylene oxide (especially from 6 to 40 moles of ethylene oxide per mole of nonyl phenol), reaction products of ethylene oxide with fatty acids and with fatty alcohols, e.g. polyoxyethylene sorbitan monolaurate. As anionic-type surfactants may be mentioned: sodium lauryl sulfate, sodium N-methyl, N-oleyl-taurate, sodium alkylaryl polyether sulfonates and sodium alkyl naphthalene sulfonate.

Copolymers of alkyl styrenes and N-vinyl heterocyclic monomers useful in this invention are those wherein the heterocyclic ring contains 5 or 6 members and is composed of carbon atoms with one or more oxygen or nitrogen atoms. Examples are t-butyl styrene/N-vinyl-2-pyrrolidone, t-butyl styrene/N-vinyl caprolactam, t-butyl styrene/N-vinyl piperidone, t-butyl styrene/N-vinyl-2-oxazolidinone, t-butyl styrene/N-vinyl-2-oxazinidinone (3-vinyl-tetrahydro-2H-1,3-oxazin-2-one), t-butyl styrene/ N-vinyl-3-morpholinone, and the related copolymers wherein the t-butyl group is substituted by an alkyl group of from 3–8 carbons. These copolymers can be prepared by the method disclosed in the application of B. L. Atkins, Ser. No. 19,128, filed Mar. 12, 1970.

The amount of suspending agent used must vary to suit the reaction conditions, taking into account the kind of olefin monomer, catalyst, rate of stirring, etc., such that the starting olefin liquid phase is dispersed as small non-colloidal droplets but not emulsified into the aqueous phase and such that the resulting polymer product is produced as small beads but not as colloidally dispersed particles. Generally, the suspending agent will be present in an amount effective to assist in maintaining the liquid monomer as discrete droplets but not effective to colloidally emulsify the liquid monomer. Thus, at least a small effective amount of suspending agent in the order of 0.01% or more based on the weight of olefin is normally necessary to avoid having the olefin oil phase and polymer product coalesce and congeal into a large intractable mass, but more than about 5% based on the weight of olefin should not be used in order to avoid colloidally emulsifying the monomer and forming a latex-like product. The exact amount used is thus within the skill of the art but we prefer to use an amount in the range of 0.05% to 1.5% by weight based on the weight of olefin.

The amount of reactants in our process vary also according to the reaction conditions. Generally, the sulfur dioxide must be used in an amount which will keep an aqueous solution saturated with respect to sulfur dioxide throughout the reaction. The alpha-olefins must be added so that at least 5% and not more than 65% by weight with respect to the water is present. Our preferred range is from 15–60% by weight of alpha-olefins based on the amount of water medium.

The following non-limiting examples are presented to illustrate our invention.

EXAMPLE 1

A 20-gallon glass reactor fitted with an air-powered paddle stirrer, a stainless steel $SO_2$ inlet tube, and two water-cooled condensers, was charged with 60 liters of deionized water and saturated at 23° C. with gaseous $SO_2$ for a four-hour period. A total of 180 mls. of Dowfax 9N10 (a nonylphenoxy polyethoxyethanol surfactant containing 10 moles of ethylene oxide per mole of nonyl phenol) was dispersed in the water with stirring. Immediately thereafter, 18 liters (56.7 moles) of a mixture of a $C_{16}$, $C_{18}$ and $C_{20}$ alpha olefins in approximate equal proportions and having a minimum monoolefin content of 98.5 weight percent and a specific gravity of 0.786–.795 and 120 mls. of Lupersol 11 (a mineral spirits solution containing 75% t-butyl peroxy pivalate) was added to the reactor with stirring speed maintained at 300 r.p.m. Sulfur dioxide was added continuously at a rate of 12 g./min. over the 24-hour reaction period, care being taken to maintain the temperature below about 25° C. After this time, the reaction product was in the form of small particulate beads dispersed in the water. Air and nitrogen were used to purge the system to remove the final traces of free $SO_2$. The polymer was separated from the water by conventional filtration and, after being washed with deionized water to remove excess $SO_2$ and monomer, it was air-dried. The finely divided beads (approx. 60 microns in diameter) were free of odor and color and had a molecular weight range of $4.4 \times 10^4$–$17 \times 10^6$ with a peak molecular weight of $2.1 \times 10^6$ as indicated by Gel Permeation Chromatography. Yield of product was >80% based on the olefin.

EXAMPLE 2

Two 3-liter Pyrex resin kettles equipped with stirrers and thermometers were set in a constant temperature water bath maintained at 31°±1° C. Each reactor was charged with 750 g. of deionized water and to this was added 250 g. of n-tetradecene-1. The mixture was stirred at 250 r.p.m. with a paddle stirrer while a steady flow of nitrogen, introduced through a dip tube below the surface of the mixture, was continued for approximately 20 minutes. Following this the $SO_2$ was introduced in the same manner (through the dip tube) until the contents (water and olefin) of each flask was saturated with the gas. Both reactors were partially shielded from light by the use of a black polyethylene cover. After saturation with $SO_2$, 5.0 g. Lupersol 11 (a 75% mineral spirits solution of t-butyl peroxy pivalate) was added as an initiator to both kettles. Immediately following, 5.0 g. of a 20% solids latex consisting of a copolymer of 70% by weight N-vinyl pyrrolidone and 30% by weight t-butyl styrene was added to kettle No. 2 as a suspending agent. The flow of $SO_2$ to each kettle was continued at about 0.85 g./min. Kettle No. 2 immediately turned white (milky). When about 5 ml. of the suspension from kettle Ni. 1 was added to isopropanol, transparent beads were observed, which stuck together easily when stirred. When the same thing was done with the suspension from kettle No. 2, soft, white, opaque beads were observed which when stirred did not agglomerate and stick together.

The flow of $SO_2$ was allowed to continue for a period of about 21–22 hours and then discontinued and the kettles were purged with nitrogen for 1½ hours to remove excess sulfur dioxide. Temperature was maintained at 30–32° C. in the reaction mixture and stirring was continuous during the entire time.

At sometime during the reaction period the stirrer in kettle No. 1 had stopped due to the agglomeration of the polysulfone polymer around the stirrer and dip tube. This polymer was a spongy, mass of various sized particles which, upon drying, weighed 288 g., which represented about 87% conversion based on theory. The polymer had a peak molecular weight of $4.1 \times 10^5$ by Gel Permeation Chromatography (G.P.C.). The polymer from kettle No. 2 consisted of small spherical beads of uniform size, which were transparent after drying, and weighed 290 g., giving about the same conversion as that obtained in kettle No. 1. The polymer from this kettle had a peak molecular weight of $1.74 \times 10^6$ by G.P.C.

EXAMPLE 3

The effect of ferrous ions on the molecular weight is shown in the following comparative examples:

A volume of 1040 ml. of a $C_{16-20}$ α-olefin was suspended in 1560 ml. of deionized water which had been saturated with $SO_2$ at 20° C. over a period of 18 hours. Prior to suspension 10.4 ml. of Lupersol 11 was added to the oil phase (olefin) and 4.2 ml. to the water phase. To suspend the monomer the mixture was stirred slowly at 100 r.p.m. for about 1 minute, then rapidly at 1000 r.p.m. for 10 minutes after which 15.6 g. of Dowfax 9N9 surfactant was added to stabilize the suspension. Then additional sulfur dioxide was introduced at the rate of 0.3 g./min. and polymerization was continued for 24 hours while the temperature was maintained at about 20–25° C. Hard white polymer beads were obtained which had a peak molecular weight of $2.85 \times 10^6$ as measured by gel permeation chromatography (G.P.C.).

A second experiment was conducted in the same way, except that 25 p.p.m. $FeSO_4$ (based on olefin) was added five minutes after addition of catalyst at the start of polymerization. This polymer had a molecular weight peak of $1.08 \times 10^6$ as measured by G.P.C.

EXAMPLE 4

The use of an anionic surfactant is illustrated by the following. A volume of 1300 ml. of deionized water was saturated at 20° C. with $SO_2$ for 18 hours. To this was added 1300 ml. of $C_{16-20}$ α-olefin containing 9.1 ml. of Lupersol 11 and the mixture was stirred at 1000 r.p.m. After 15 minutes 7.0 g. of sodium lauryl sulfate (Dupanol C) was added and stirring was continued at about 300 r.p.m. An $SO_2$ pad was used during the polymerization which was continued for 24 hours. The hard white polymer beads were found to have a molecular weight peak of about $2 \times 10^6$ as measured by G.P.C.

EXAMPLES 5–8

According to the procedure set forth in Example 2, the pure olefins shown in Table I have been used to prepare polysulfones by our process with equally good results.

EXAMPLE 9

Following the procedure set forth in Example 1, a $C_{14}$-$C_{16}$ olefin fraction from the polymerization of ethylene by the Gulf process having a minimum monoolefin content of 98.5% by weight and a specific gravity of .773–.781 was used to make a polysulfone.

Various modifications of our invention will probably occur to those skilled in this art and hence we desire that our invention be limited solely by the appended claims and the prior art.

TABLE I

| Example | Olefin | Percent catalyst/ vol. of olefin | Range of polymer, molecular weight | Peak mol. wt. | Melting range, ° C. |
|---|---|---|---|---|---|
| 5 | Decene-1 | 1.05 | $490$–$11.6 \times 10^6$ | $.107 \times 10^6$ | 155–165 |
| 6 | Dodecene-1 | 0.90 | $.96 \times 10^4$–$13.2 \times 10^6$ | $1.1 \times 10^6$ | 145–155 |
| 7 | Tetradecene-1 | 0.79 | $.54 \times 10^4$–$14.7 \times 10^6$ | $1.4 \times 10^6$ | 135–145 |
| 8 | Hexadecene-1 | 0.70 | $.80 \times 10^4$–$16.3 \times 10^6$ | $2.1 \times 10^6$ | 110–120 |

We claim:
1. A method for the production of a high molecular weight polysulfone from sulfur dioxide and a monomer selected from the group consisting of an α-monoolefin of 10–20 carbon atoms and mixtures thereof which comprises the steps of
   (a) mechanically dispersing the monomer in a water solution saturated with respect to sulfur dioxide and containing a suspending agent selected from the group consisting of a nonionic surfactant, an anionic surfactant and copolymers of alkyl styrenes and N-vinyl heterocyclic monomers in an amount effective to assist in maintaining the monomer as discrete droplets but not effective to colloidally emulsify the same;
   (b) adding sulfur dioxide with stirring, in the presence of a member of the group consisting of high energy radiation, organic peroxide catalysts, and ionic catalysts, until the droplets of monomer are substantially converted to discrete beads of olefin polysulfone polymer; and (c) recovering said beads.

2. A method as set forth in claim 1 in which the suspending agent is used in an amount from 0.01 to 5.0 percent based on the weight of olefin.

3. A method as set forth in claim 1 in which said suspending agent is added after the addition of said monomer.

4. A method as set forth in claim 1 in which the amount of said monomer used is between 5 and 65% by weight of the water present.

5. A method as set forth in claim 1 in which the monomer used is a mixture of a α-monoolefins having 16, 18 and 20 carbon atoms.

6. A method as set forth in claim 1 in which the monomer used is an α-monoolefin hydrocarbon selected from the group consisting of decene-1 and tetradecene-1.

7. In a method for the production of a high molecular weight polysulfone from sulfur dioxide and a monomer selected from the group consisting of an α-monoolefin of 10–20 carbon atoms and mixtures thereof wherein the monomer is mechanically dispersed in a water solution saturated with respect to sulfur dioxide, sulfur dioxide is added with stirring, in the presence of a member of the group consisting of high energy radiation, organic peroxide catalysts, and ionic catalysts, until the droplets of monomer are substantially converted to discrete beads of olefin polysulfone polymer, the improvement which comprises adding a suspending agent to said water solution in an amount effective to assist in maintaining the monomer as discrete droplets wherein the suspending agent is selected from the group consisting of a nonionic surfactant, an anionic surfactant and copolymers of alkyl styrenes and N-vinyl heterocyclic monomers.

8. A method for the production of a high molecular weight polysulfone from sulfur dioxide and a monomer selected from the group consisting of an α-monoolefin of 10–20 carbon atoms and mixtures thereof which comprises the steps of (a) mechanically dispersing the monomer in a water solution saturated with respect to sulfur dioxide and containing a nonionic surfactant suspending agent in the amount of from 0.01 to 5.0 percent based on the weight of olefin;

(b) adding sulfur dioxide with stirring, in the presence of a member of the group consisting of high energy radiation, organic peroxide catalysts, and ionic catalysts, until the droplets of monomer are substantially converted to discrete beads of olefin polysulfone polymer; and (c) recovering said beads.

9. A method for the production of a high molecular weight polysulfone from sulfur dioxide and a monomer selected from the group consisting of an α-monoolefin of 10–20 carbon atoms and mixtures thereof which comprises the steps of (a) mechanically dispersing the monomer in a water solution saturated with respect to sulfur dioxide and containing an anionic surfactant suspending agent in the amount of from 0.01 to 5.0 percent based on the weight of olefin;

(b) adding sulfur dioxide with stirring, in the presence of a member of the group consisting of high energy radiation, organic peroxide catalysts, and ionic catalysts, until the droplets of monomer are substantially converted to discrete beads of olefin polysulfone polymer; and (c) recovering said beads.

10. A method for the production of a high molecular weight polysulfone from sulfur dioxide and a monomer selected from the group consisting of an α-monoolefin of 10–20 carbon atoms and mixtures thereof which comprises the steps of (a) mechanically dispersing the monomer in a water solution saturated with respect to sulfur dioxide and containing a suspending agent consisting essentially of copolymers of alkyl styrenes and N-vinyl heterocyclic monomers in the amount from 0.01 to 5 percent based on the weight of olefin;

(b) adding sulfur dioxide with stirring, in the presence of a member of the group consisting of high energy radiation, organic peroxide catalysts, and ionic catalysts, until the droplets of monomer are substantially converted to discrete beads of olefin polysulfone polymer; and (c) recovering said beads.

References Cited
UNITED STATES PATENTS

| | | | |
|---|---|---|---|
| 2,572,185 | 10/1951 | Noether | 260—79.3 |
| 2,652,368 | 9/1953 | Melstrom et al. | 260—79.3 |
| 2,853,373 | 9/1958 | Stuart | 260—79.3 |
| 3,396,115 | 8/1968 | Moore | 260—79.3 |
| 3,546,144 | 12/1970 | Chatelain | 260—79.3 |

OTHER REFERENCES

Snow et al.: "Reaction of Sulfur Dioxide with Olefins," Industrial and Eng. Chem., February 1938, pp. 176–182.

JAMES A. SEIDLECK, Primary Examiner

U.S. Cl. X.R.

204—159.22